United States Patent
Ahn et al.

(10) Patent No.: US 10,843,384 B2
(45) Date of Patent: Nov. 24, 2020

(54) PROCESS FOR THE PRODUCTION OF THERMOPLASTIC MOULDING COMPOUNDS

(71) Applicant: INEOS STYROLUTION GROUP GMBH, Frankfurt am Main (DE)

(72) Inventors: SangJun Ahn, Seoul (KR); Wolfgang Fischer, Walldorf (DE); Norbert Niessner, Friedelsheim (DE); Brian J. Banaszak, Mannheim (DE); Roland Walker, Osnabrueck (DE); Ula El-Jaby, Ludwigshafen (DE); Achim Stammer, Freinsheim (DE); Klaus-Dieter Hungenberg, Birkenau (DE); Bernd Hisgen, Neuhofen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 234 days.

(21) Appl. No.: 15/735,286

(22) PCT Filed: Jun. 9, 2016

(86) PCT No.: PCT/EP2016/063127
§ 371 (c)(1),
(2) Date: Dec. 11, 2017

(87) PCT Pub. No.: WO2016/198508
PCT Pub. Date: Dec. 15, 2016

(65) Prior Publication Data
US 2018/0178411 A1    Jun. 28, 2018

(30) Foreign Application Priority Data
Jun. 12, 2015 (EP) ..................... 15171967

(51) Int. Cl.
*C08F 279/04* (2006.01)
*B29B 7/74* (2006.01)
(Continued)

(52) U.S. Cl.
CPC ............. *B29B 7/7485* (2013.01); *B01J 8/10* (2013.01); *B01J 8/20* (2013.01); *B01J 8/38* (2013.01);
(Continued)

(58) Field of Classification Search
CPC ................... C08F 279/04; C08F 2/01
See application file for complete search history.

(56) References Cited

U.S. PATENT DOCUMENTS 3,851,014 A * 11/1974 Dalton ................. C08J 3/005
525/86
4,275,177 A * 6/1981 Walkenhorst ......... B01F 15/066
165/109.1
(Continued)

FOREIGN PATENT DOCUMENTS

DE    2846757 A1    5/1980
EP    0471550 A2    2/1992
(Continued)

*Primary Examiner* — Rip A Lee
(74) *Attorney, Agent, or Firm* — J.A. Lindeman & Co. PLLC

(57) ABSTRACT

The invention relates to a process for the production of thermoplastic moulding compounds, in particular for the production of acrylonitrile-butadiene-styrene (ABS), wherein at least a first reagent (11) and a second reagent (12) of the thermoplastic moulding compounds are fed to a loop conduit (29) which comprises a static mixer (36), wherein the reagents (11, 12) are pressed in loops through the loop conduit (29) and passing the static mixer (36), whereby the reagents (11, 12) are dispersed to form a dispersion (15) in the static mixer (36). The invention also relates to a ther- (Continued)

moplastic moulding compound that is produced by the inventive process.

13 Claims, 2 Drawing Sheets

(51) Int. Cl.
- *B29B 7/32* (2006.01)
- *B29B 7/60* (2006.01)
- *B29B 7/12* (2006.01)
- *B01J 8/38* (2006.01)
- *B01J 8/10* (2006.01)
- *B01J 19/18* (2006.01)
- *C08L 55/02* (2006.01)
- *B01J 8/20* (2006.01)
- *B29B 7/24* (2006.01)
- *C08L 25/12* (2006.01)
- *B01J 19/24* (2006.01)
- *C08F 257/02* (2006.01)
- *C08F 267/08* (2006.01)
- *B29K 55/02* (2006.01)

(52) U.S. Cl.
CPC .......... *B01J 8/388* (2013.01); *B01J 19/1837* (2013.01); *B01J 19/1881* (2013.01); *B01J 19/2465* (2013.01); *B29B 7/12* (2013.01); *B29B 7/24* (2013.01); *B29B 7/325* (2013.01); *B29B 7/60* (2013.01); *B29B 7/7461* (2013.01); *B29B 7/7466* (2013.01); *B29B 7/7495* (2013.01); *C08F 257/02* (2013.01); *C08F 267/08* (2013.01); *C08L 25/12* (2013.01); *C08L 55/02* (2013.01); *B29K 2055/02* (2013.01); *C08F 279/04* (2013.01)

(56) References Cited

U.S. PATENT DOCUMENTS

| | | | | |
|---|---|---|---|---|
| 5,256,732 | A | * | 10/1993 | Morita ................. B01J 19/0013 525/52 |
| 5,851,463 | A | | 12/1998 | Guntherberg et al. |
| 5,883,189 | A | | 3/1999 | Eichenauer et al. |
| 5,958,316 | A | | 9/1999 | Guntherberg et al. |
| 5,981,644 | A | * | 11/1999 | Ostarek ................. C08F 279/04 524/500 |
| 6,165,399 | A | | 12/2000 | Guntherberg et al. |
| 6,239,225 | B1 | * | 5/2001 | Michels ................. C08F 279/02 525/242 |
| 6,482,897 | B1 | * | 11/2002 | Weider ................. C08F 279/04 525/242 |
| 8,334,349 | B2 | * | 12/2012 | Yamashita ............. C08F 2/001 526/310 |
| 10,525,439 | B2 | * | 1/2020 | Ahn .......................... B01J 8/20 |
| 2002/0111435 | A1 | | 8/2002 | Gasche et al. |
| 2006/0034962 | A1 | | 2/2006 | Guntherberg et al. |
| 2016/0152813 | A1 | | 6/2016 | Niessner et al. |

FOREIGN PATENT DOCUMENTS

| | | |
|---|---|---|
| EP | 0735077 A1 | 10/1996 |
| EP | 2308902 A1 | 4/2011 |
| JP | S57167303 A | 10/1982 |
| JP | S60222223 A | 11/1985 |
| JP | H02286208 A | 11/1990 |
| JP | 2011132426 A | 7/2011 |
| WO | 98/13412 A1 | 4/1998 |
| WO | 2004/028781 A1 | 4/2004 |
| WO | 2009/103714 A2 | 8/2009 |
| WO | 2015/000873 A1 | 1/2015 |

* cited by examiner

PROCESS FOR THE PRODUCTION OF THERMOPLASTIC MOULDING COMPOUNDS

The invention relates to a process for the production of thermoplastic moulding compounds (compositions), in particular for the production of acrylonitrile-butadiene-styrene (ABS), out of at least a first reagent (component) and a second reagent (component). The invention also relates to a thermoplastic moulding compound that is produced by the inventive process.

It is known from the prior art to produce thermoplastic polymers, such as acrylonitrile-butadiene-styrene (ABS) by means of an extruder, in particular by means of a twin-screw extruder. In this case, the reagents, in particular styrene-acrylonitrile copolymer (SAN) and a polybutadiene based rubber, are fed to an extruder. The rubber can be present in the form of SAN-grafted rubber, respectively of SAN-grafted elastomer. Within the extruder, the reagents are melted and mixed, and/or dispersed, to form a dispersion and to form a moulding compound or a polymer blend. In this case, the rubber feed, in particular in the form of SAN-grafted rubber or SAN-grafted elastomer, is dispersed in a styrene-acrylonitrile matrix. Also other means for producing thermoplastic polymers are known, for example single screw extruders, kneading machines or banbury sheet compounding units.

WO 2009/103714 discloses a twin-screw extruder for extruding moulding compounds. The twin-screw extruder comprises in this case two screws which are accommodated in a barrel and which rotate in the same direction. The twin-screw extruder further comprises a feed zone, a transition zone and an output zone. The reagents are fed as moulding compound to the feed zone, which for this purpose has a charging opening. The moulding compound can be fed in this case in solid form, in particular as granules, but also molten, and therefore viscous, to the feed zone. The moulding compound is taken into the feed zone by means of the two screws, transported further and compressed. In the transition zone which follows the feed zone, the moulding compound is melted and homogenized. In the output zone, further homogenization of the moulding compound which is present as melt proceeds. Optionally, further residues present of solid particles are also fused. In addition, the material components are uniformly distributed. Also, the temperature of the melt is made uniform. In addition, in the output zone, a pressure necessary for extrusion through an extrusion die is built up.

WO 1998/13412 describes screw machines which have at least one pinch-off section having at least one baffle element and an associated dewatering opening upstream of the first baffle element.

In addition, the screw machines contain degassing sections which are situated downstream of the last plasticizing section.

The degassing openings and dewatering openings can be provided with a device which prevents escape of extrusion material. Retention screws are described as preferred for this purpose. The degassing and dewatering of thermoplastic moulding compounds by means of screw machines is also known. EP-A 0735077 describes a process for the production of impact-modified thermoplastics by mechanical dewatering of an elastomeric component and mixing with a thermoplastic polymer in a screw machine. The dewatering openings are provided with retention screws and are operated at overpressure.

JP S02-286208 (1990) discloses three different dewatering processes by means of an extruder which is equipped with two screws. Moisture in liquid form and additionally in gaseous form is withdrawn from the extrusion mix in each case via Seiher barrels.

Document JP H57-167303 (1982) describes that an extrusion mix, in this case, e.g., slurries of polymer particles, is metered into a twin-screw extruder, dewatered, degassed and kneaded. Upstream of the compression zone, water can escape from the extruder in liquid form. Residual moisture can escape in gaseous form. Seiher barrels are used as dewatering openings. JP H60-222223 (1985) discloses a process in which water in liquid form is withdrawn from an extrusion material, preferably a food, but also other materials. The dewatering proceeds by means of a twin-screw extruder. The moisture is discharged backwards through an opening which is attached to a vacuum pump.

A device for the extrusion of thermoplastics, in particular a screw machine, proceeds from WO 2004/028781. The device in this case comprises a degassing opening and a dewatering opening which is equipped, for example, with a metal wire cloth. JP 2011 132 426 A discloses a method for producing rubber-reinforced thermoplastic resin composition. Thereby, reagents are supplied to a loop type reactor containing a pump and tubular reactors with static mixing structures.

WO 2015/000873 discloses a process for the manufacturing of ABS-molding compositions. Thereby, an elastomer component, a thermoplastic polymer, a further polymer and additives are mixed in an extruder, comprising the steps of precipitating the elastomer component and mechanical dewatering of the elastomer component which leads to improved salt-free products.

In DE 28 46 757, a method for sintering of styrene-acrylonitrile graft polymers from dispersions is disclosed. The process is carried out in a tubular reactor, in particular in an extruder. In U.S. Pat. No. 3,851,014, a method for making rubber modified resins using a static mixer is disclosed. After devolatilisation, the polymer product is further processed typically by extruding.

One object of the invention is to provide a simplified and cheaper process for the production of thermoplastic moulding compounds (compositions). These moulding compounds are frequently polymer blends, in particular ABS or ASA.

This object is achieved according to the invention by a process for the production of thermoplastic moulding compounds, in particular for the production of acrylonitrile-butadiene-styrene (ABS), wherein at least a first reagent and a second reagent of the thermoplastic moulding compounds are fed to a loop conduit which comprises at least one static mixer, wherein the reagents are pressed in loops through the loop conduit and passing the static mixer, whereby the reagents are dispersed to form a dispersion in the static mixer.

The produced thermoplastic moulding compounds (compositions) comprise or consist of a polymer blend. The blend contains one or more polymers which are dispersed as relatively small particles, e.g. rubber polymer particles, within a polymer matrix, e.g. a SAN-copolymer matrix, which contains one or more other polymers. The at least two polymer reagents are the polymer matrix and the polymer(s) to be dispersed in the polymer matrix.

In particular, the process according to the invention is suitable for the production of copolymer compositions, e.g. acrylonitrile-butadiene-styrene (ABS) or acrylonitrile-butadiene-acrylate (ASA). The first reagent for the production of acrylonitrile-butadiene-styrene contains or consists of styrene-acrylonitrile copolymers (SAN).

The first reagent styrene-acrylonitrile copolymer (SAN) is fed to the loop conduit preferably in the molten state, and thus in the viscous state.

The styrene-acrylonitrile copolymer (SAN) can be solved in a solution with one or several solvents, preferably 30%-99%, or can be heated above melting temperature (range). Typical examples of such SAN copolymers are commercially available, e.g. from Styrolution, Germany.

In this case, the second reagent contains or consists of one or several rubber components, in particular in form of SAN grafted elastomer, with the elastomer preferably being a poly-butadiene based rubber. Hence, the second reagent can be a SAN grafted rubber. The SAN grafted elastomer is a wet or dry powder with a powder (average) particle size in the range of 1 to 1000 micrometer, with each powder particle being coagulated SAN grafted particles. The SAN grafted elastomer powder has a moisture content in the range of 0.5% to 40%.

The second reagent rubber, which is a SAN grafted elastomer, and which is a synthetic polymer, is likewise fed to the loop conduit preferably as relatively fine powder, in particular having an average particle size of 10 to 1000, often 50 to 800 micrometer.

Alternatively, the second reagent rubber, which is a SAN grafted elastomer, is likewise fed to the loop conduit in the molten state, and thus in the viscous state. The SAN grafted elastomer can be solved in a solution with one or several solvents, in particular as solution with 1%-60% moisture content, or can be heated above melting temperature (range).

In the static mixer, the rubber, in particular the SAN grafted elastomer powder, is then dispersed in a styrene-acrylonitrile (SAN) matrix. As a result of which step the dispersion is formed.

The process for the production of thermoplastic moulding compounds is, for example, also suitable for the production of acrylonitrile styrene acrylate (ASA), which is a blend of styrene-acrylonitrile (SAN) with a SAN grafted acrylate based rubber.

One or more solvents can be added to the reagents. The solvent can be, for example, EB (ethylbenzene), AN (acrylonitrile), SM (styrene monomer) or mixtures thereof. However, other solvents are in principle also useable.

According to one embodiment of the process, the reagents and the at least one solvent are first mixed to form a premix, and the premix of the reagents is fed to the loop conduit with the static mixer, and the matrix polymer is melted. The premix of the reagents is viscous and preferably has a moisture content of 0% to 30%, often 1% to 30%.

The premixing preferably takes place in a mixing vessel in which a beater rotates. Owing to the rotation of the beater, the premixing of the reagents to form the premix then proceeds. The premix of the reagents can be fed directly into the loop conduit with the static mixer after premixing of the reagents has been performed. In this case, the viscous premix of the reagents is passed, for example, through a pipe or through a flexible tubing directly from the mixing vessel into the loop conduit and to the static mixer and is dispersed in the static mixer.

According to an advantageous embodiment of the process, the premix of the reagents is pressed through the static mixer and back to the mixing vessel, in which the premix has been formed of the reagents. Hence, the mixing vessel is also arranged within the loop conduit, as the static mixer is.

Alternatively, the premix of the reagents can also be stored temporarily after premixing has been performed and later fed to the loop conduit with the static mixer. In particular, the premix of the reagents can be produced at a different location and then can be transported to the loop conduit with the static mixer.

Preferably, the reagents are pressed in several loops through the loop conduit, in particular through the static mixer, in a range from 1 time to 100 times, often 20 to 80 times.

Preferably, the loop conduit also comprises a pump, and the reagents are pressed in loops through the loop conduit and through the static mixer by means of the pump. The pump can be of the gear pump type. Preferably, the reagents are dispersed at a temperature at a range of 160° C. to 250° C., in particular at a range of 190° C. to 210° C.

The dispersion thus resulting can then be processed further to form the moulding compounds, in particular to form acrylonitrile-butadiene-styrene compositions (ABS). The further processing comprises, for example, a removal of solvent remaining in the resulting dispersion, and also a dewatering step(s). In addition, additives can be added and pelletizing can be carried out.

Thermoplastic moulding compounds, in particular acrylonitrile-butadiene-styrene (ABS), can be produced advantageously by the inventive process. The invention is further illustrated by the Figures and the claims.

Further embodiments of the invention will be described in more detail with reference to the drawings, the description hereinafter, and the claims.

Figure 1:
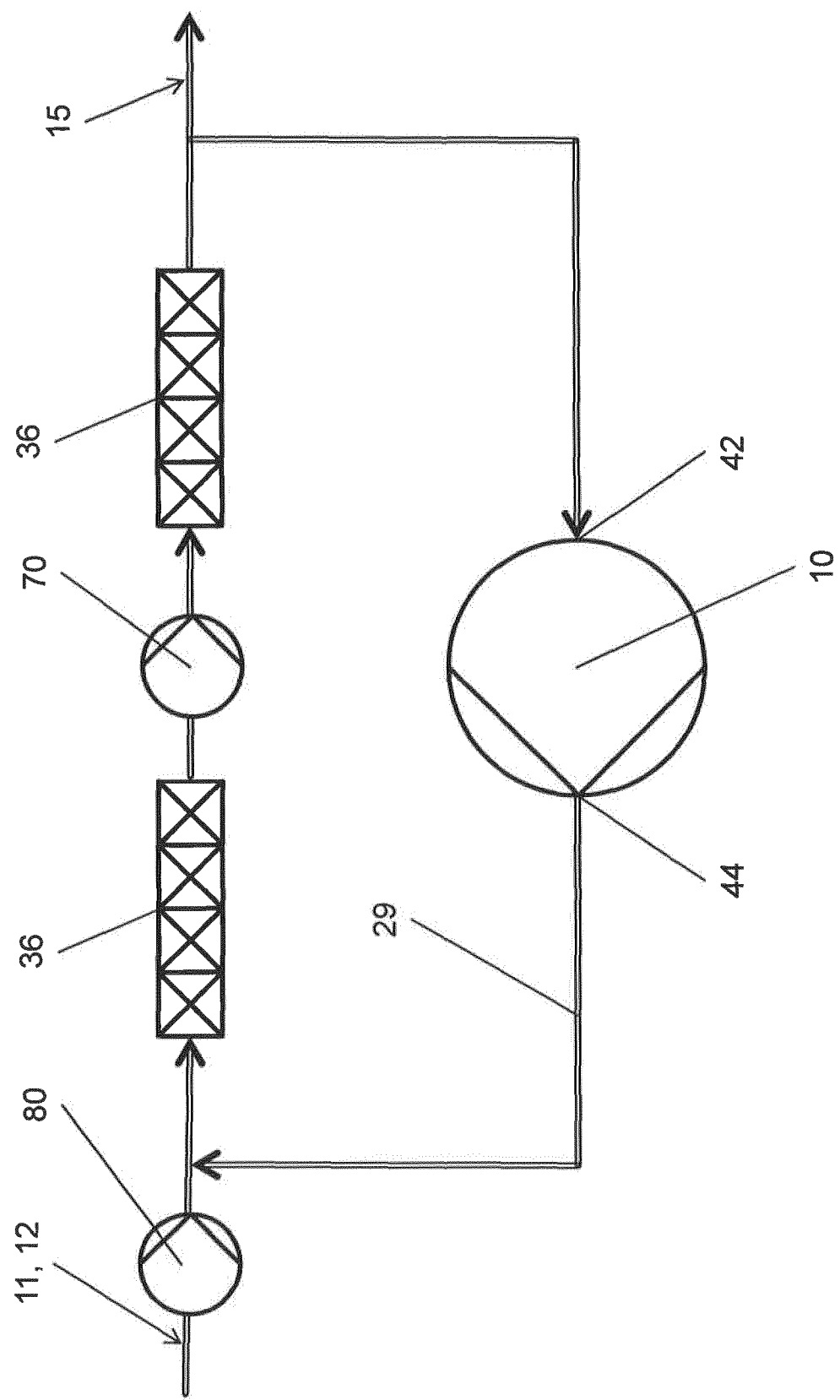
FIG. 1 shows a schematic drawing of a first embodiment of a system for the production of moulding compounds.

In FIG. 1, a schematic drawing of a first embodiment of a system for the production of moulding compounds, in particular for the production of acrylonitrile-butadiene-styrene (ABS), is shown.

The system comprises a loop conduit 29 that contains several static mixers 36. The static mixers 36 are implemented as static mixing sections containing one or multiple static mixing elements. In this embodiment, the system comprises two static mixers 36. However, systems with only one static mixer 36 or with more than two static mixers 36 are also feasible. In this embodiment, the static mixers 36 are arranged in series. It is also possible to arrange several static mixers 36 in parallel.

The loop conduit 29 of the system also contains a first pump 10. The first pump 10 has an inlet 42 and an outlet 44. Reagents 11, 12 can be fed to the inlet 42 of the first pump 10 and are pressed out through the outlet 44 of the first pump 10. In this embodiment, the first pump 10 is of the gear pump type. But also other kinds of pumps are useable within the loop conduit 29 of the system.

In this embodiment, the loop conduit 29 of the system also contains a second pump 70. The second pump 70 is arranged between the two static mixers 36. In this embodiment, the second pump 70 is of the gear pump type and is assembled like the first pump 10. But also other kinds of pumps are useable within the loop conduit 29 of the system. Furthermore, the system contains a third pump 80. The third pump 80 is arranged at the entrance of the loop conduit 29. In this embodiment, the third pump 80 is of the gear pump type and is assembled like the first pump 10. But also other kinds of pumps are useable within system.

For the production of acrylonitrile-butadiene-styrene (ABS), in particular a first reagent 11 and a second reagent 12 are fed to the loop conduit 29, wherein in particular the first reagent 11 is styrene-acrylonitrile-copolymer (SAN), and the second reagent 12 is rubber, e.g. polybutadiene-rubber.

The second reagent 12 rubber is specifically a SAN grafted elastomer, with the elastomer preferably being a polybutadiene based rubber.

Hence, the second reagent can be a SAN grafted rubber. The reagents 11, 12 are fed to the loop conduit 29 by means of the third pump 80 that is arranged at the entrance of the loop conduit 29.

The process is also useable for the production of different thermoplastic moulding compounds. For example, for the production of acrylonitrile styrene acrylate (ASA), in particular the first reagent 11 is styrene-acrylonitrile-copolymer (SAN), and the second reagent 12 is a SAN grafted acrylate based rubber.

After feeding the reagents 11, 12 to the loop conduit 29, the first reagent 11 and the second reagent 12 are then pressed in loops through the loop conduit 29, in particular through the static mixers 36, by means of the first pump 10. Within such a loop, the first reagent 11 and the second reagent 12 are pressed through the outlet 44 of the first pump 10 towards the static mixers 36, and passing the static mixers 36 towards the inlet 42 of the first pump 10.

The second pump 70 supports the movement of the reagents 11, 12 through the loop conduit 29. Within each static mixer 36, respectively within each static mixing section, there is a pressure drop during operation. The second pump 70 increases pressure within the loop conduit 29 downstream of such a static mixer 36.

In particular within the static mixers 36, the reagents 11, 12 are dispersed to form dispersion 15. After a certain number of loops within the loop conduit 29, the dispersion 15 can be taken out of the loop conduit 29. Afterwards, the resultant dispersion 15 is further processable to form moulding compounds, in particular to form acrylonitrile-butadiene-styrene (ABS).

Upstream of the loop conduit 29, an incoming valve that is not shown here is provided. When said incoming valve is open, the reagents 11, 12 can be fed through said incoming valve to the loop conduit 29 with the static mixers 36. Downstream of the loop conduit 29, an outgoing valve that is not shown here is provided. When said outgoing valve is open, the resultant dispersion 15 can be fed through said outgoing valve out of the loop circuit 29.

Within a process for the production of moulding compounds, in particular for the production of acrylonitrile-butadiene-styrene (ABS), the first reagent 11 and the second reagent 12 are fed to the loop conduit 29 while the incoming valve is open and the outgoing valve is closed. The reagents 11, 12 are pressed through the loop conduit 29, in particular through the static mixers 36, by means of the first pump 10.

Within such a loop through the loop conduit 29 and passing the static mixers 36, a partition of the reagents 11, 12 is dispersed to a dispersion 15. Within every new loop, some more of the reagents 11, 12 are dispersed to the dispersion 15. The resultant dispersion 15 also travels around within the loop conduit 29 and passing the static mixers 36. Thereby, the resultant dispersion 15 is also homogenized.

After a certain number of loops within the loop conduit 29, the reagents 11, 12 are dispersed, at least almost, completely. That means, only the dispersion 15 that is also homogenized, then travels around within the loop conduit 29, still forwarded by the first pump 10.

Then, the outgoing valve is opened and the incoming valve is closed. The dispersion 15 is then pressed out of the loop conduit 29 and through the outgoing valve by means of the first pump 10. When the dispersion 15 has left the loop conduit 29, the outgoing valve is closed and the incoming valve is opened again. While the incoming valve is open, the first reagent 11 and the second reagent 12 are fed to the loop conduit 29, again, and the first pump 10 forwards the reagents 11, 12 in loops through the loop conduit 29.

Within an alternative, continuous process for the production of moulding compounds, in particular for the production of acrylonitrile-butadiene-styrene (ABS), the incoming valve and the outgoing valve are open and remain open during the production process. The first reagent 11 and the second reagent 12 are fed to the loop conduit 29 and the first pump 10 forwards the reagents 11, 12 through the loop conduit 29, in particular through the static mixers 36.

Within said alternative, continuous process, a partition of the reagents 11, 12 is dispersed to a dispersion 15 when passing the static mixers 36. A part of the reagents 11, 12 and the dispersion 15 remain within the loop conduit 29 and are pressed to the inlet 42 of the first pump 10. Said part of the reagents 11, 12 and the dispersion 15 hence travel around within the loop conduit 29 in a loop.

Thereby the reagents 11, 12 are dispersed in the static mixers 36 to the dispersion 15, and the resultant dispersion 15 is homogenized. A part of the resultant dispersion 15 is pressed out of the loop conduit 29 towards the outgoing valve.

Subsequently, further processing, in particular dewatering, of the resultant dispersion 15 then takes place to give moulding compounds, in particular to provide acrylonitrile-butadiene-styrene copolymer compositions (ABS).

Figure 2:
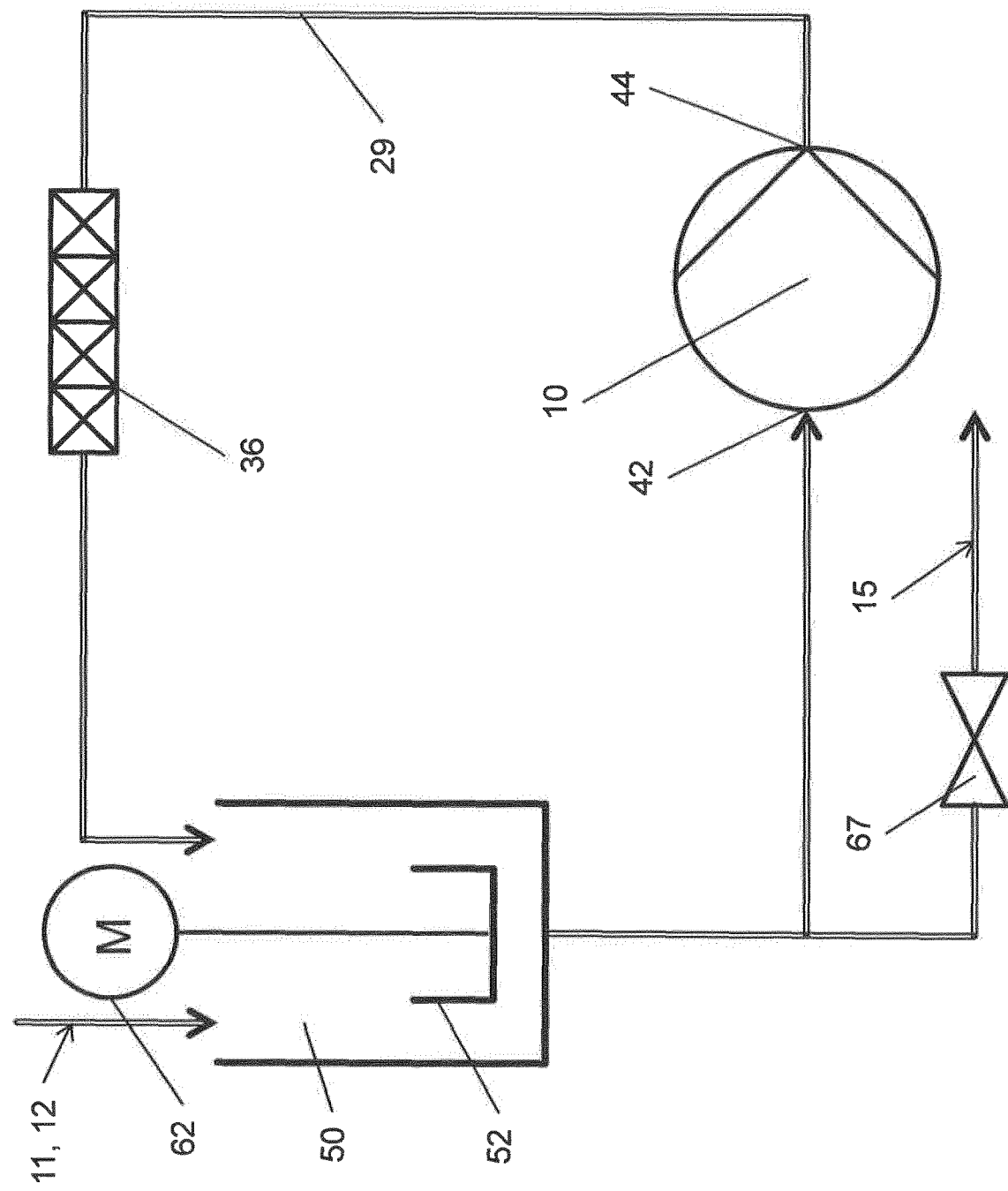
FIG. 2 shows a schematic drawing of a second embodiment of a system for the production of moulding compounds.

In FIG. 2, a schematic drawing of a second embodiment of a system for the production of moulding compounds, in particular for the production of acrylonitrile-butadiene-styrene (ABS), is shown.

Additionally to the first pump 10 and the static mixer 36, the loop conduit 29 further comprises a mixing vessel 50. The mixing vessel 50 has a beater 52 which is drivable by an electric motor 62. In this embodiment, only one static mixer 36 is provided. However, several static mixers 36, arranged in series as well as in parallel, can be used, as described above.

The loop conduit 29 may further comprise a second pump 70 arranged within the loop conduit 29 downstream of the static mixer 36 and upstream of the mixing vessel 50. In this case, the second pump 70 supports the movement of the reagents 11, 12 through the loop conduit 29 by increasing pressure within the loop conduit 29 downstream of the static mixer 36.

Furthermore, the system may contain a third pump 80 arranged at the entrance of the vessel 50. In this case, the reagents 11, 12 are fed to the vessel 50 by means of the third pump 80.

Also, an outgoing valve 67 is provided for taking the dispersion 15 out of the loop conduit 29. In this embodiment, the outgoing valve 67 is arranged at a branch downstream of the mixing vessel 50 and upstream of the first pump 10. However, said branch at which the outgoing valve 67 is arranged, can also be located at a different place in the loop conduit 29.

Within a process for the production of moulding compounds, in particular for the production of acrylonitrile-butadiene-styrene (ABS), using the system according to FIG. 2, the first reagent 11 and the second reagent 12 are fed to the mixing vessel 50.

Additionally, a solvent, for example EB (ethylbenzene), can be added to the reagents 11, 12. Within the mixing vessel 50, by a rotation of the beater 52, a premixing of the reagents 11, 12 proceeds to form a premix.

The resultant premix of the reagents 11, 12 is then fed to the inlet 42 of the first pump 10 while the outgoing valve 67 is closed. The premix of the reagents 11, 12 is forwarded in loops through the loop conduit 29 towards the static mixer 36 by means of the first pump 10. From the static mixer 36, the premix of the reagents 11, 12 is fed further through the loop conduit 29 and back to the mixing vessel 50.

Within such a loop through the loop conduit 29 and passing the static mixers 36 and the mixing vessel 50, a partition of the reagents 11, 12 is dispersed to dispersion 15. Within every new loop, some more of the reagents 11, 12 are dispersed to the dispersion 15. The resultant dispersion 15 also travels around within the loop conduit 29 and passing the static mixers 36 and the mixing vessel 50. Thereby, the resultant dispersion 15 is also homogenized.

After a certain number of loops within the loop conduit 29, the reagents 11, 12 are dispersed, at least almost, completely. That means, only the dispersion 15 that is also homogenized, then travels around within the loop conduit 29, still forwarded by the first pump 10.

Then, the outgoing valve 67 is opened, and the resultant dispersion 15 is then pressed out of the loop conduit 29 and delivered through the outgoing valve 67 by means of the first pump 10.

Subsequently, further processing, in particular dewatering, of the resultant dispersion 15 then takes place to give moulding compounds, in particular to give ABS-compositions, as described above.

The further part describes preferred embodiments of the invention.

The thermoplastic molding compound that is produced comprises the first reagent, which is a thermoplastic copolymer A, and the second reagent, which is a graft copolymer B, and optionally further components K, wherein the molding composition comprises:
40 to 80 wt % of at least one thermoplastic copolymer A obtainable from: 20 to 31 wt %, based on the copolymer A, of acrylonitrile and: 69 to 80 wt %, based on the copolymer A, of styrene or α-methylstyrene or a mixture of styrene and α-methylstyrene,
20 to 60 wt % of the graft copolymer B; and
0 to 5 wt % of further components K,
where the components A, B and K sum to 100 wt %.

The copolymer A contains or consists of styrene-acrylonitrile copolymers (SAN) and is preferably produced from the components acrylonitrile and styrene and/or α-methylstyrene by bulk polymerization or in the presence of one or more solvents. Preference is given to copolymers A having weight-average molar masses Mw of from 50,000 to 300,000 g/mol, where the weight molar masses may be determined, for example, by means of GPC with tetrahydrofuran as solvent and with UV detection. The copolymer A forms the matrix of the thermoplastic molding compound. The number-averaged molar masses (Mn) of the copolymer matrix A is preferably from 15,000 to 100,000 g/mol (determined by GPC with tetrahydrofuran as solvent and with UV detection). The viscosity of the copolymer matrix A (determined according to DIN 53726 at 25° C. in a 0.5 wt % solution in DMF) is, for example, from 50 to 120 ml/g. The copolymer matrix A may be produced by bulk polymerization/solution polymerization in, for example, toluene or ethylbenzene according to a process such as is described, for example, in Kunststoff-Handbuch, Vieweg-Daumiller, Vol V, (Polystyrol), Carl-Hanser-Verlag, Munich 1969, pages 122 f., lines 12 ff.

Graft copolymer B, which is a SAN grafted rubber (elastomer) can be constructed from: B1: 40 to 85 wt %, based on the solids content of the graft copolymer B, of a graft substrate (B1) obtainable by:
(a) polymerizing: (B11): 0 to 21 wt %, based on the graft substrate B1, of at least one vinylaromatic monomer, in particular styrene, and (B12): 79 to 100 wt %, based on the graft substrate B1, of at least one diene, in particular butadiene, where (B11) and (B12) sum to 100 wt %; and
(b) agglomerating the obtained graft substrate B1 by adding (C): 0.01 to 5 parts by weight, based on 100 parts by weight of the graft substrate B1, in each case based on the solids content, of an agglomerating copolymer (C) of: (C1): 80 to 99.9 wt % of one or more hydrophobic C1 to C12 alkyl acrylates or C1 to C12 alkyl methacrylates and (C2): 0.1 to 20 wt % of one or more hydrophilic comonomers selected from the group consisting of methacrylamide, acrylamide, methylacrylamide, ethylacrylamide and n-butylacrylamide, where (C1) and (C2) sum to 100 wt %; and
B2: 15 to 60 wt %, based on the solids content of the graft copolymer B, of a graft sheath obtainable by reacting the agglomerated graft substrate B1 with a mixture of: (B21) 70 to 90 wt %, based on the graft sheath (B2), of styrene and/or α-methylstyrene, in particular styrene, and (B22) 10 to 30 wt %, based on the graft sheath (B2), of acrylonitrile and/or methyl methacrylate, in particular acrylonitrile, where the graft substrate B1 and the graft sheath B2 sum to 100 wt % in total.

As the further components K, the thermoplastic molding compound may comprise one or more components selected from the group consisting of dispersants, fillers and additives D. As the component K, the thermoplastic molding compounds may further also comprise 0 to 5 wt % of fibrous or particulate fillers or mixtures thereof, in each case based on the amount of the components A plus B plus K. Examples of fillers or reinforcers that may be employed include glass fibers that may be finished with a sizing and a coupling agent, glass beads, mineral fibers, aluminum oxide fibers, mica, quartz flour or wollastonite. It is also possible to admix with the molding compounds metal flakes, metal powder, metal fibers, metal-coated fillers, for example nickel-coated glass fibers, and other additive substances that shield electromagnetic waves. It is also possible to add carbon fibers, carbon black, in particular conductivity carbon black, or nickel-coated carbon fibers.

Various additives (D) may be added to the molding compounds in amounts of from 0 to 5 wt % as assistants and processing additives. Suitable added substances (D) include all substances customarily employed for processing or finishing the polymers. Examples include, for example, dyes, pigments, colorants, antistatic agents, antioxidants, stabilizers for improving thermal stability, stabilizers for increasing photostability, stabilizers for enhancing hydrolysis resistance and chemical resistance, anti-thermal de-composition agents and in particular lubricants that are useful for production of molded bodies/articles. These further added substances may be admixed at any stage of the manufacturing operation, but preferably at an early stage in order to profit early on from the stabilizing effects (or other specific effects) of the added substance. For further customary assistants and added substances, see, for example, "Plastics Additives Handbook", Ed. Gächter and Müller, 4th edition, Hanser Publ., Munich, 1996.

Examples of suitable pigments include titanium dioxide, phthalocyanines, ultramarine blue, iron oxides or carbon black, and also the entire class of organic pigments.

Examples of suitable colorants include all dyes that may be used for the transparent, semi-transparent, or non-transparent coloring of polymers, in particular those suitable for coloring styrene copolymers.

Examples of suitable flame retardants that may be used include the halogen-containing or phosphorus-containing compounds known to the person skilled in the art, magnesium hydroxide, and also other commonly used compounds, or mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use so-called co-stabilizers, in particular phosphorus- or sulfur-containing costabilizers. These phosphorus- or sulfur-containing co-stabilizers are known to those skilled in the art. Examples of suitable light stabilizers include various substituted resorcinols, salicylates, benzotriazoles and benzophenones.

The following example and claims further describe the invention.

A thermoplastic molding compound is produced by a process as outlined which comprises copolymer A, graft co-polymer B, and further components K, wherein the molding composition comprises: 79 wt % of commercial SAN copolymer A, 20 wt % of the graft copolymer B (ABS); and 1 wt % of further components K (antioxidants Irganox and lubricant). This process for the production of the ABS-composition is made, wherein the SAN, the ABS are fed to a loop conduit which comprises a static mixer and the reagents (components) are pressed in loops through the loop conduit and passing the static mixer, whereby the reagents and the additives are dispersed to form a dispersion in the static mixer.

LIST OF REFERENCE SIGNS 10 first pump
11 first reagent
12 second reagent
15 dispersion
29 loop conduit
36 static mixer
42 inlet
44 outlet
50 mixing vessel
52 beater
62 electric motor
67 outgoing valve
70 second pump
80 third pump

The invention claimed is:

1. A process for the production of acrylonitrile-butadiene-styrene (ABS), comprising the following steps:
   a. adding at least one solvent to a first reagent (11) that contains or consists of styrene-acrylonitrile copolymer (SAN) and a second reagent (12) that contains or consists of rubber,
   b. mixing the at least one solvent, the first reagent (11) and the second reagent (12) in a mixing vessel (50) to form a premix,
   c. feeding the premix to a loop conduit (29) which comprises at least one static mixer (36),
   d. pressing the reagents (11, 12) in loops through the loop conduit (29), and
   e. dispersing the reagents (11, 12) to form a dispersion (15) in the static mixer (36),
   and wherein the premix is pressed through the static mixer (36) back to a mixing vessel (50).

2. The process according to claim 1, comprising a step of feeding the first reagent (11) styrene-acrylonitrile copolymer (SAN) to the loop conduit (29) in a molten state.

3. The process according to claim 1, comprising a step of heating the first reagent (11), which contains or consists of styrene-acrylonitrile copolymer (SAN), above melting temperature.

4. The process according to claim 1, comprising a step of feeding the second reagent (12), which contains or consists of rubber, to the loop conduit (29) as relatively fine powder.

5. The process according to claim 1, comprising a step of feeding the second reagent (12) rubber to the loop conduit (29) in a molten state.

6. The process according to claim 1, comprising a step of feeding the premix directly into the loop conduit (29).

7. The process according to claim 1, comprising a step of storing the premix temporarily and later feeding the premix to the loop conduit (29).

8. The process according to claim 1, comprising a step of pressing the reagents (11, 12) in loops through the loop conduit (29) from 1 time to 100 times.

9. The process according to claim 1, comprising a step of pressing the reagents (11, 12) in loops through the loop conduit (29) by a first pump.

10. The process according to claim 1, comprising a step of dispersing the reagents (11, 12) at a temperature at a range of 160° C. to 250° C.

11. The process according to claim 1, comprising a step of processing the dispersion (15) further to form acrylonitrile-butadiene-styrene (ABS).

12. The process according to claim 1, further comprising the steps of:
   a. feeding the premix to an inlet (42) of a first pump (10) while an outgoing valve (67) for taking the dispersion (15) out of the loop conduit (29) is closed,
   b. forwarding the premix in loops through the loop conduit (29) toward the static mixer (36) by of the first pump (10),
   c. opening the outgoing valve (67) after a certain number of loops within the loop conduit (29),
   d. pressing out the dispersion (15) of the loop conduit (29) and delivering the dispersion (15) through the outgoing valve (67) by the first pump (10).

13. The process according to claim 12, wherein
   the outgoing valve (67) is arranged at a branch downstream of the mixing vessel (50) and upstream of the first pump (10).

* * * * *